US010419070B2

(12) United States Patent
Horsley et al.

(10) Patent No.: US 10,419,070 B2
(45) Date of Patent: Sep. 17, 2019

(54) METHOD AND APPARATUS FOR OPERATING A DIGITAL SUBSCRIBER LINE ARRANGEMENT

(71) Applicant: British Telecommunications Public Limited Company, London (GB)

(72) Inventors: Ian Horsley, London (GB); Trevor Linney, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/759,340

(22) PCT Filed: Sep. 16, 2016

(86) PCT No.: PCT/EP2016/072012
§ 371 (c)(1),
(2) Date: Mar. 12, 2018

(87) PCT Pub. No.: WO2017/046351
PCT Pub. Date: Mar. 23, 2017

(65) Prior Publication Data
US 2018/0254798 A1    Sep. 6, 2018

(30) Foreign Application Priority Data

Sep. 16, 2015 (EP) ..................... 15185538

(51) Int. Cl.
*H04B 3/32* (2006.01)
*H04B 3/46* (2015.01)
(Continued)

(52) U.S. Cl.
CPC ............ *H04B 3/32* (2013.01); *H04B 3/46* (2013.01); *H04B 3/487* (2015.01); *H04B 3/50* (2013.01); *H04L 5/0007* (2013.01); *H04L 5/143* (2013.01)

(58) Field of Classification Search
CPC . H04B 3/32; H04B 3/487; H04B 3/46; H04B 3/50; H04L 5/0007; H04L 5/143
See application file for complete search history.

(56) References Cited

U.S. PATENT DOCUMENTS 6,650,697 B1 * 11/2003 Tate ...................... H04L 1/0001
375/219
7,035,400 B1 * 4/2006 Gaikwad ................. H04L 5/143
370/201

(Continued)

FOREIGN PATENT DOCUMENTS

EP    2 645 690 A1    10/2013
EP    2 852 067 A1    3/2015

(Continued)

OTHER PUBLICATIONS

International Search Report for corresponding International Application No. PCT/EP2016/072012 dated Dec. 19, 2016; 3 pages.

(Continued)

*Primary Examiner* — Duc C Ho
(74) *Attorney, Agent, or Firm* — Patterson Thuente Pedersen, P.A.

(57) ABSTRACT

A digital subscriber line arrangement includes a first downstream Access Node (AN) modem, a first upstream Customer Premises Equipment (CPE) modem, a second AN modem, a second CPE modem and first and second metallic pairs connected between the first and second modems, respectively. The first AN modem includes a length estimation module and a PSD mask selection module which together with a PSD mask store operate to select upstream and downstream PSD masks for use by the first CPE modem and the first AN modem, respectively. Selection of the masks depends upon the estimated line length and the manner in which neighboring communication link is operating. Additionally, a central controller is operable to perform selection (Continued)

or generation of such masks in a similar manner when centralized control over the PSD mask generation is desired.

7 Claims, 6 Drawing Sheets

(51) Int. Cl.
*H04B 3/487* (2015.01)
*H04B 3/50* (2006.01)
*H04L 5/00* (2006.01)
*H04L 5/14* (2006.01)

(56) References Cited

U.S. PATENT DOCUMENTS

| | | |
|---|---|---|
| 8,588,285 B2 | 11/2013 | Humphrey et al. |
| 10,091,022 B2 | 10/2018 | Horsley et al. |
| 10,193,594 B2 | 1/2019 | Al Rawi et al. |
| 2001/0021185 A1 | 9/2001 | Heusala |
| 2003/0099286 A1* | 5/2003 | Graziano ............ H04L 1/0001 375/222 |
| 2007/0274404 A1* | 11/2007 | Papandriopoulos ..... H04B 3/32 375/260 |
| 2008/0130640 A1 | 6/2008 | Hurwitz et al. |
| 2008/0292313 A1 | 11/2008 | Mahony et al. |
| 2009/0322556 A1 | 12/2009 | Cook et al. |
| 2012/0063531 A1* | 3/2012 | Ginis ................. H04L 7/0016 375/285 |
| 2016/0105215 A1 | 4/2016 | Wang et al. |
| 2017/0085719 A1 | 3/2017 | Linney et al. |

FOREIGN PATENT DOCUMENTS

WO WO 2018/087104 A1 5/2018
WO WO 2018/087106 A1 5/2018

OTHER PUBLICATIONS

Written Opinion of the International Searching Authority for corresponding International Application No. PCT/EP2016/072012 dated Dec. 19, 2016; 6 pages.
ETSI TS 101 270-1 V1.2.1 Technical Specification Transmission on Multiplexing (TM); Access transmission systems on metallic access cables; Very high speed Digital Subscriber Line (VDSL); Part 1: Functional requirements; European Telecommunications Standards Institute Oct. 1999; Valbonne—France; 60 pages.
Strobel; Coexistence of G.Fast and VDSL in FTTDP and FTTC Deployments; Rainer Strobel & Wolfgang Utschick; $23^{rd}$ European Signal Processing Conference (EUSIPCO) Munchen, Germany; 5 pages.
ITU-T Telecommunication Standardization Sector of ITU G.994.1 as extended by G.9701; Apr. 2017; Series G: Transmission Systems and Media, Digital Systems and Networks; Digital sections and digital line system—Metallic access Networks Handshake procedures for digital subscriber line transceivers; 910 pages.
Application as filed for U.S. Appl. No. 16/348,043, filed May 7, 2019, Inventor(s): Horsley et al.
Application as filed for U.S. Appl. No. 16/348,053, filed May 7, 2019, Inventor(s): Horsley et al.
International Search Report and Written Opinion for PCT Application No. PCT/EP2017/078509 dated Feb. 2, 2018; 11 pages.
International Search Report and Written Opinion for PCT Application No. PCT/EP2017/078512 dated Feb. 26, 2018; 10 pages.

* cited by examiner

METHOD AND APPARATUS FOR OPERATING A DIGITAL SUBSCRIBER LINE ARRANGEMENT

CROSS-REFERENCE TO RELATED APPLICATIONS

The present application is a National Phase entry of PCT Application No. PCT/EP2016/072012, filed on Sep. 16, 2016, which claims priority to EP Patent Application No. 15185538.4, filed on Sep. 16, 2015, which are hereby fully incorporated herein by reference.

TECHNICAL FIELD

The present disclosure relates to a method and apparatus for operating a digital subscriber line operating in accordance with a Time Division Duplex (TDD) protocol which is capable of transmitting and receiving signals at frequencies falling within a frequency range which overlaps with the possible transmission frequency range of a neighboring line (e.g. employing a Digital Subscriber Line protocol such as VDSL2). An example of such a protocol is the currently under-development protocol known in the industry as G.fast and as described (at least to some extent) in the ITU standards G.9700 and G.9701. For the purposes of the present application, the proposed G.fast protocol is considered to be a Digital Subscriber Line (DSL) technology and any modems operating in accordance with it are considered to be DSL modems.

Digital subscriber lines are twisted copper pair lines with Digital Subscriber Line (DSL) modems operating at both ends of the line. This permits data to be communicated over a line at much greater data rates than is achievable with old voice-band modems operating over the same twisted copper pairs and is generally therefore referred to as "DSL broadband". The DSL modems operate in accordance with various DSL standards agreed by the International Telecommunication Union (ITU). Over time newer DSL standards have been (and are still being) developed which permit ever greater data transmission rates to be achieved over digital subscriber lines. For example VDSL2 (as described in ITU standard G.993.2) is currently the highest capability DSL protocol for use with short lines (e.g. from a street cabinet to an end user's premises) which are already commercially in operation in the United Kingdom, whilst G.fast is still currently under development with commercially available G.fast compliant modems expected to be available commercially shortly.

In particular, the present disclosure relates to a DSL modem (whether an end user (Customer Premises Equipment (CPE)) modem or a modem contained within an Access Node such as a Digital Subscriber Line Access Multiplexer (DSLAM) or a Multiple Services Access Node (MSAN) etc.), as well as to an Access Node containing such a modem, the modem or Access Node terminating a digital subscriber line, and a method of operating such a modem or Access Node in which a Power Spectrum Density mask is obtained (whether by selection or generation (e.g. by calculation)), and used, which permits a balance between good performance of one line without impacting too heavily on neighboring lines.

BACKGROUND

A particular problem experienced by DSL connections operating at increasingly higher frequencies is known as FEXT (Far End CROSS Talk) (note that the VDSL2 standard uses higher frequencies than say ADSL1, and G.fast uses higher frequencies than VDSL2, etc.—in particular VDSL2 uses an additional band of frequencies for upstream transmissions at much higher frequencies than those used for upstream transmissions in ADSL).

In a typical arrangement within an access network, a single Access Node (AN) (e.g. a Digital Subscriber Line Access Multiplexor (DSLAM) located in a street cabinet) is connected via multiple respective copper pairs to multiple respective Customer Premises Equipment (CPE) DSL modems, and the multiple copper pairs typically extend in close proximity to one another for at least a part of their extent (e.g. within a common cable binder). Each of the connecting lines can be considered as having a remote end at which the CPE device is connected and a near (or access network) end at which the AN is connected.

In such an arrangement (as will be well understood by persons skilled in the art of telecommunications), FEXT is noise (induced into a first line from an adjacent line) as measured by a device at a first end (remote/near) of the first line which is caused by signals transmitted by a modem at the far end (near/remote) of the adjacent line. Thus in a case where an AN serves (via an AN VDSL2 modem) a first CPE (having a CPE VDSL2 modem) via a first copper (or metallic) pair using VDSL2 and serves (via an AN G.fast modem) a second CPE (having a CPE G.fast modem) via a second copper (or metallic) pair using G.fast, the G.fast modem can cause FEXT into the CPE VDSL2 modem at the remote end of the first copper pair by virtue of any transmissions having sufficient spectral power at frequencies of use to the VDSL2 modem, and similarly the AN VDSL2 modem can cause FEXT into the CPE G.fast modem at the remote end of the first copper pair. Moreover, the CPE G.fast modem at the remote end of the second copper pair, can cause FEXT into the AN VDSL2 modem at the near end of the first copper pair, and similarly the CPE VDSL2 modem at the remote end of the first copper pair can cause FEXT into the AN G.fast modem at the near end of the second copper pair.

In contrast to FEXT, the other principal type of cross talk affecting communications over copper access networks is known as NEXT (Near End cross(X)Talk). NEXT is similar to FEXT except that it arises primarily from transmissions from a modem in an Access Node (AN) being received as noise (via electromagnetic induction from one line to another) by another modem in the AN (note NEXT can also arise from transmissions from a modem in different AN to that in which the "victim" modem is located, but normally this only occurs where the AN's are geographically very close to one another—e.g. collocated within the same housing structure such as a street cabinet or an Exchange building or Central Office (CO)), or by transmissions from a CPE modem being received as noise by another neighboring CPE modem (where neighboring here means that the lines terminated by the respective CPE modems are sufficiently close together for at least part of their extent that signals can "leak" from one line to the other to a significant degree).

In most modern access networks operating DSL, NEXT is not a big problem because all of the protocols employed contemporaneously within the network (e.g. SHDSL, ADSL, VDSL etc.) use an aligned Frequency Division Duplex (FDD) plan whereby if a frequency range set aside for upstream transmissions in one aligned protocol (e.g. ADSL) is used by another protocol, it will only be used by that other protocol for upstream transmissions, and similarly if a frequency range set aside in one protocol for downstream transmissions is used by another protocol, it will only be used by that other protocol for downstream transmissions. As such, no modems within an Access Node (in say the United Kingdom—if they are operating in accordance with the UK's Access Network Frequency Plan (ANFP)) will be transmitting signals in "upstream" designated frequency bands and similarly no CPE modems will be transmitting in "downstream" designated bands (or in other words, for all frequencies at which an AN modem is transmitting (downstream), no AN modems attempt to receive (upstream) transmissions from CPE modems, and for all frequencies at which a CPE modem is transmitting (upstream), no CPE modems attempt to receive (downstream) transmissions from an AN modem).

However, in the proposed G.fast protocol (e.g. as specified in ITU standards G.9700 and G.9701), rather than using an FDD protocol, a TDD protocol is used instead. This means that when an AN modem is transmitting (unless it is otherwise constrained by a PSD mask) it will transmit in all frequencies including those assigned to upstream transmissions in VDSL2, and similarly when a CPE modem is transmitting it will transmit in all frequencies including those designated as downstream bands. Accordingly, when an AN modem is transmitting, it may cause NEXT into neighboring VDSL AN modems in overlapping VDSL "upstream" designated frequency bands, and similarly when a CPE modem is transmitting it may cause NEXT into neighboring VDSL CPE modems in overlapping VDSL "downstream" designated frequency bands. Moreover, in many circumstances, the effect of NEXT will be more disruptive to neighboring lines than FEXT would have been for the same level of power spectral density (PSD)—i.e. in many circumstances, the NEXT coupling from a near end to near end device (i.e. a remote CPE device to another remote CPE device, or an AN modem to another AN modem) is stronger than the FEXT coupling from the corresponding far end device (i.e. an AN modem to a CPE device of a neighboring line, or a CPE device to an AN modem of a neighboring line).

To account for this possibility for undesirable NEXT to occur, it has been proposed that any line operating using G.fast should basically use only frequencies above the maximum usable frequency for VDSL2 if there are any neighboring lines operating using VDSL2 (on the other hand if there are no neighboring VDSL2 lines, then the G.fast line can use all available frequencies usable according to the G.fast standard—including those below the maximum usable frequency for VDSL2). This may be implemented by providing a suitable PSD mask which constrains the modems from operating above a certain specified PSD level at specified frequencies (namely those at which a neighboring VDSL2 modem could operate). This should ensure that there will be no undesirable crosstalk (neither FEXT nor NEXT) from a G.fast line (whether from the AN G.fast modem or from the CPE G.fast modem) to a neighboring VDSL2 line/modem. However, this is a very conservative approach and results in G.fast lines operating at data rates significantly lower than they otherwise could have done if this constraint were not placed upon them.

SUMMARY

According to a first aspect of the present disclosure, there is provided a method of operating a power spectral density controlled modem within a first communication link comprising a first pair of metallic wires and communicating modems connected at each end thereof, the first pair of metallic wires having an access network end and a remote end and the communicating modems comprising a first access network side modem connected to the access network end of the first pair of metallic wires and a first remote side modem connected to the remote end of the first pair of metallic wires, wherein the controlled modem is one of the communicating modems and is a discrete multitone modulation modem operating using time division duplexing and is operable to employ a first set of tones, whose frequencies fall within a first operational frequency range, wherein the first communication link is operated within the vicinity of at least a second communication link comprising a second pair of metallic wires and communicating modems connected at each end thereof, the modems of the second communication link being discrete multitone modulation modems operating using frequency division duplexing and being operable to employ a second set of tones, whose frequencies fall within a second operational range, wherein the first and second communication links are physically located sufficiently closely together for at least a part of their extent, and are operable to employ operational frequency ranges overlapping to a sufficient extent, and at a sufficiently high PSD, that there is a possibility of the controlled modem generating a transmission signal which causes undesirable near end crosstalk interference to the second communication link, the method comprising: estimating the line length of the first pair of metallic wires; generating or selecting a PSD mask, wherein the generated or selected PSD mask depends upon the estimated length of the first pair of metallic wires; and controlling the power of transmissions from the controlled modem, by frequency, in accordance with the thus generated or selected PSD mask.

In some embodiments, the generated or selected mask additionally depends upon whether the second communication link is operating as part of a vectored group of cooperating communication links, wherein if it is, the selected or generated mask places a greater constraint on the maximum permitted PSD value for the controlled modem at at least certain frequency ranges.

In some embodiments, if the controlled modem is the first remote side modem, the generated or selected PSD mask is an upstream PSD mask (or more precisely an upstream TDD PSD mask) and if the controlled modem is the first access network side modem, the generated or selected PSD mask is a downstream PSD mask (or more precisely a downstream TDD PSD mask) and the generated or selected PSD masks in respect of at least some estimated line length values contain one or more PSD reductions, relative to a base PSD mask.

The reductions of the PSD mask for use in controlling the controlled modem preferably depend upon the extent to which near end crosstalk (NEXT) is estimated to exceed far end crosstalk (FEXT) for a communication link whose connecting metallic pair has a length similar to the estimated length of the first metallic pair, as a function of frequency.

In some embodiments, the base PSD mask depends upon the extent to which an aligned frequency division duplex, FDD, modem at an access network side should be constrained to prevent harmful far end crosstalk (i.e. FEXT) to neighboring remote end (CPE) modems in downstream designated frequency ranges and upon the extent to which an aligned frequency division duplex, FDD, modem at a remote side should be constrained to prevent harmful far end crosstalk (i.e. FEXT) to neighboring access network side (CPE) modems in upstream designated frequency ranges.

In some embodiments the base PSD mask, for a given estimated line length, is a common base mask (applicable for both upstream and downstream TDD PSD masks) with different reductions (for at least some estimated line lengths) being made to generate the upstream and downstream PSD masks respectively.

In some embodiments, in order to generate an upstream TDD PSD mask, the common base mask, for at least some line lengths, is reduced in downstream designated frequency ranges by an amount to account for the estimated extent to which, in those downstream designated frequency ranges, NEXT coupling from the remote end, CPE TDD modem (when it is transmitting in those downstream designated frequency ranges) to a neighboring remote end modem is considered to be stronger than corresponding FEXT coupling to that neighboring remote end modem from an access network side modem would have been. Similarly, in order to generate a downstream PSD mask, the common base mask, for at least some line lengths, can be reduced in upstream designated frequency ranges by an amount to account for the estimated extent to which, in those upstream designated frequency ranges, NEXT coupling from the access network side TDD modem (when it is transmitting in those upstream designated frequency ranges) to a neighboring access network side modem is considered to be stronger than corresponding FEXT coupling to that neighboring access network side modem from a remote end CPE modem would have been.

In some embodiments, the base PSD mask is formed from a combination of upstream and downstream FDD masks as will be explained in greater detail below.

In other words, in some embodiments, the upstream (downstream) TDD PSD mask suitable for application to a CPE or remote side TDD modem (access network side or AN modem) constrains the CPE (AN) modem in upstream (downstream) transmission frequency ranges to transmit signals with a PSD in those frequency ranges no greater than that by which the corresponding FDD PSD mask would constrain an FDD CPE (AN) modem (this is reasonable because a TDD modem should cause no greater FEXT interference for a given PSD than a similar FDD CPE (AN) modem would). However, in the downstream (upstream) designated frequency ranges, the Base TDD PSD mask needs to constrain the TDD modem to generate signals having a PSD within such frequency ranges which is no greater than that of signals which could be transmitted by an access network side (remote side) FDD modem; this base mask then needs to be adjusted for an upstream (downstream) TDD PSD mask by reducing the permitted PSD levels in the downstream (upstream) frequency ranges to account for the extent to which near end cross talk (NEXT) from the CPE (AN) TDD modem to another "victim" CPE (AN) modem is stronger than the corresponding FEXT that the "victim" modem would ordinarily expect to receive from an access network side (remote end side) FDD modem transmitting in such a frequency range with a PSD constrained by a downstream (upstream) FDD PSD mask. Additionally, it can be further reduced if necessary—e.g. to comply with a constraint specific to the TDD protocol, or for any other reason.

Persons skilled in the art of Digital Subscriber Line technology will be aware of the possibility of lines implementing Upstream Power Back Off (UPBO) in order to minimize the effect of FEXT from a remote end modem operating on a "short" line; without UPBO remote end modem's operating on a "short" "interfering" line can cause significant (and largely unnecessary) FEXT to the access network side modem of a neighboring "victim" line which can be particularly problematic if the "victim" line is much longer than the "interfering" line such that the remote end modem of the victim line is much further away from the access network side modem than the remote end modem of the "interfering" line. UPBO mitigates against this effect by requiring remote end modems of short lines (e.g. of less than 500 m) to reduce the power with which they transmit signals (relative to remote end modems connected to longer lines—e.g. of greater than 500 m).

In some embodiments, the base masks (for a given line length there can be just one common base mask, but for different line lengths there are corresponding different base masks, primarily (or solely) to take account of UPBO) can be derived from a combination of the PSD masks that would be appropriate for frequency division duplex modems (e.g. a VDSL2 modems) operating across the first metallic pair (as regards the frequency ranges at which such modems would generally transmit data carrying signals) as described above. Since the base masks may differ only in respect of the extent of UPBO reduction in upstream designated frequency ranges, it may be convenient to assemble a base PSD mask where necessary by selecting a common set of downstream PSD break points and combining them with a specific set of upstream PSD break points as applicable for the estimated length of the first copper pair.

In summary, in an embodiment, if the generated or selected PSD mask is an upstream PSD mask, the PSD mask includes one or more permitted power spectral density level reductions, relative to the permitted power spectral density level of an associated downstream PSD mask that would be applicable to an access network side frequency division duplex discrete multitone modulation modem if it were operating on the first communication link in place of the first access network side modem, and if the generated or selected PSD mask is a downstream PSD mask, the PSD mask includes one or more permitted power spectral density level reductions, relative to the permitted power spectral density level of an associated downstream PSD mask that would be applicable to an access network side frequency division duplex discrete multitone modulation modem if it were operating on the first communication link in place of the first access network side modem.

In some embodiments of the present disclosure, the first communication link operates in accordance with the G.fast protocol while the second communication link operates in accordance with the VDSL2 protocol, and more generally Frequency division duplex refers to VDSL2 and Time division duplex refers to G.fast (e.g. a TDD modem is a G.fast modem and an FDD modem is a VDSL2 modem, etc.).

In some embodiments, the PSD reductions with respect to a base PSD mask constrain the respective G.fast modem to generate transmission signals (during an appropriate respective time slot—e.g. an upstream timeslot for a remote end modem and a downstream timeslot for a access network side modem) with power spectral density level whose value varies with frequency over each respective Upstream (for access network side G.fast/TDD modems) or Downstream (for remote end side G.fast/TDD modems) designated frequency portion in accordance with a pre-calculated difference between FEXT and NEXT for lines having a length approximately equal to the line length estimated in the estimating step, wherein the frequency ranges over which the permitted power spectral density is reduced in this way may be subject to an absolute PSD cap such that a reduction in PSD value is only apparent if it takes the PSD value below the overall cap.

Estimating the line length of the first pair may be carried out in the manner taught in U.S. Pat. No. 8,588,285, the contents of which are herein incorporated in their entirety by reference, with the electrical length being converted to a physical length using any appropriate well known engineering rule of thumb—such as that at 300 kHz every 11.47 dB of attenuation/loss corresponds to a length of 1 km; alternatively this rule of thumb can be employed together with Hlog information obtained by the line at synchronization directly. Note that it is possible for the line length estimation to be obtained as the result of combining measurements made by both modems of the first communications link, in which case it is possible for just one modem (e.g. the access network side modem) to make the final estimation which is then communicated to the other modem. Similarly, it is possible for one modem to generate or select the PSD masks for use in controlling both modems and for the PSD mask relevant to the other modem to be transmitted to it as part of a synchronization process. In such a case, it can be advantageous if the modems initially use the conservative PSD masks alluded to above which prevent the modems of the first communication link from generating any significant PSD within frequencies capable of being exploited by VDSL2 modems. In some embodiments the line length estimation is performed on the basis of one or more signal attenuation measurements which may conveniently be derived from the standard Hlog measurements typically generated by DSL modems as mandated by the relevant standards for VDSL2 and G.fast.

Alternatively, line length estimation may be performed centrally by a central controller having access (via a suitable interface) to a database of network records which typically includes information about line lengths. Such a central controller could then send the estimation to each relevant modem or alternatively it may then additionally perform the selection or generation of a suitable PSD mask for each TDD (e.g. G.fast) modem under its charge and then simply transmit this PSD mask to each respective modem. Such a mask selection could be done at line configuration time when the line is first switched to operate in a TDD manner.

According to a second aspect of the present disclosure, there is provided a power spectral density controlled modem for use within a first communication link, the first communication link comprising a first pair of metallic wires and communicating first modems connected at each end thereof, the first pair of metallic wires having an access network end and a remote end and the communicating modems comprising a first access network side modem connected to the access network end of the first pair of metallic wires and a first remote side modem connected to the remote end of the first pair of metallic wires, wherein the controlled modem is one of the communicating first modems and is a discrete multitone modulation modem operating using time division duplexing and is operable to employ a first set of tones, whose frequencies fall within a first operational frequency range, wherein the first communication link is operated within the vicinity of at least a second communication link comprising a second pair of metallic wires and communicating second modems connected at each end thereof, the second modems of the second communication link being discrete multitone modulation modems operating using frequency division duplexing and being operable to employ a second set of tones, whose frequencies fall within a second operational range, wherein the first and second communication links are physically located sufficiently closely together for at least a part of their extent, and are operable to employ operational frequency ranges overlapping to a sufficient extent, and at a sufficiently high PSD, that there is a possibility of the controlled modem generating a transmission signal which causes undesirable near end crosstalk interference to the second communication link, the controlled modem comprising: an instrument for obtaining measurements of the first pair of metallic wires and estimating therefrom the line length of the first pair of metallic wires; a PSD mask generator or selector for generating or selecting a PSD mask, wherein the generated or selected PSD mask depends upon the estimated length of the first pair of metallic wires; and a signal shaper for controlling the power of transmissions from the controlled modem, by frequency, in accordance with the thus generated or selected PSD mask.

The instrument for obtaining measurements of the first pair of metallic wires may comprise the conventional apparatus, included within a DSL modem compliant with VDSL2 or later DSL standards (e.g. G.fast), for determining Hlog estimations. In some embodiments the controlled modem is the AN modem since it can then easily access information from the Access Node about the operation of other lines terminating at the Access Node and use this information to ascertain (at least an estimation of) the protocols being employed by neighboring lines. This information (the line length estimation and the information about the protocols being employed by neighboring lines) can then either be passed to the CPE modem for it to perform its own generation or selection of a suitable PSD mask, or it could also perform the selection or generation.

The advantage of this aspect of the present disclosure is that it is a distributed approach so that no centralize control is required. Moreover it can be performed each time the line synchronizes rather than most conveniently being done only at the time of setting up the line initially. As such if anything should change (especially information about the protocols employed by the neighboring lines) a new better PSD mask can be selected and used. In particular, if and when all lines from a particular Access Node switch to a TDD protocol such as G.fast, then it will be possible to move to the least constraining PSD mask appropriate for the TDD protocol being used.

According to a third aspect of the present disclosure, there is provided a central controller device for generating and communicating a power spectral density mask to a power spectral density controlled modem for use within a first communication link, the first communication link comprising a first pair of metallic wires and communicating first modems connected at each end thereof, the first pair of metallic wires having an access network end and a remote end and the communicating modems comprising a first access network side modem connected to the access network end of the first pair of metallic wires and a first remote side modem connected to the remote end of the first pair of metallic wires, wherein the controlled modem is one of the communicating first modems and is a discrete multitone modulation modem operating using time division duplexing and is operable to employ a first set of tones, whose frequencies fall within a first operational frequency range, wherein the first communication link is operated within the vicinity of at least a second communication link comprising a second pair of metallic wires and communicating second modems connected at each end thereof, the second modems of the second communication link being discrete multitone modulation modems operating using frequency division duplexing and being operable to employ a second set of tones, whose frequencies fall within a second operational range, wherein the first and second communication links are physically located sufficiently closely together for at least a part of their extent, and are operable to employ operational frequency ranges overlapping to a sufficient extent, and at a sufficiently high PSD, that there is a possibility of the controlled modem generating a transmission signal which causes undesirable near end crosstalk interference to the second communication link, the central controller comprising: an interface to a records database for obtaining an estimate of the length of the first pair of metallic wires; a PSD mask generator or selector for generating or selecting a PSD mask, wherein the generated or selected PSD mask depends upon the estimated length of the first pair of metallic wires; and a transmitter for transmitting the generated or selected PSD mask to the controlled modem, for use by a signal shaper within the controlled modem for controlling the power of transmissions from the controlled modem, by frequency, in accordance with the thus transmitted PSD mask.

The third aspect of the present disclosure has the advantage that a central controller can easily access multiple network records to obtain the information about the protocols being employed by neighboring lines. Additionally, no change is required to be made to the modems which are simply instructed to comply with the appropriate PSD mask generated for each pair of G.fast modems (AN modem and CPE modem) and can in all other respects be ignorant of the method employed to obtain the correct PSD mask.

In some embodiments, the PSD mask is generated by the central controller at the time of first installing or upgrading to the TDD protocol and then thereafter only from time to time on a relatively infrequent basis.

In some embodiments, the reductions in PSD from the base PSD may include a small margin to accommodate variations in the differences between NEXT and FEXT coupling across different lines compared to the estimated amount based on predetermined estimated relationships between NEXT and FEXT coupling for typical communication links. In some embodiments, such a margin is obtained by measuring FEXT and NEXT in various different scenarios and identifying a variance between the different scenarios. Alternatively, the relationship between FEXT and NEXT can be determined using standard theoretical models of NEXT and FEXT coupling and then a margin can be chosen which causes up to a predetermined number of actual measured values of NEXT when constrained using the theoretically derived relationship between NEXT and FEXT and further constrained by the determined margin, to be below that of actually measured FEXT in respect of the same line.

Further aspects of the disclosure include processor implementable instructions for causing a processor controlled device to carry out the method of the third or fourth aspects of the present disclosure and carrier means, in some embodiments tangible carrier means such as a magnetic or optical storage disc (e.g. a hard drive platter, or a CD or DVD) or a solid state storage device (e.g. a usb mini-drive, etc.), carrying such processor implementable instructions.

Generally, in access network terminology, there is considered to be a downstream and an upstream direction, with Customer Premises Equipment being at the most downstream point. DSL modems are sometimes therefore referred to as being either upstream or downstream modems where the downstream modem is the Customer premises side or CPE modem and the upstream modem is the network side modem.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
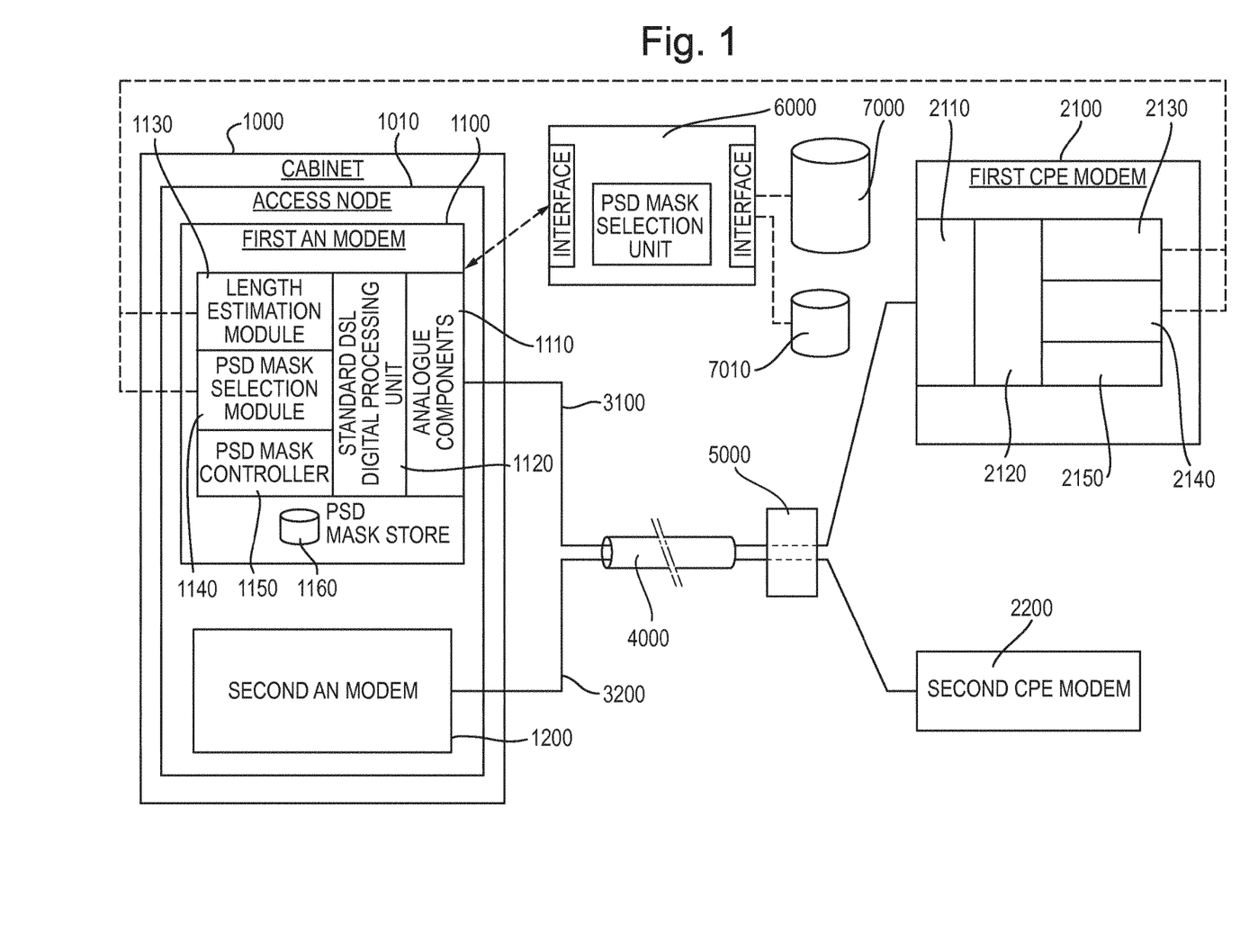
FIG. 1 is a schematic block diagram illustrating a digital subscriber line arrangement comprising a first (G.fast type) and a second (VDSL2 type) digital subscriber line communication link, each of which comprises a remote (customer premises) side modem, an access network side modem and a copper pair connection therebetween.

Referring to FIG. 1, a first embodiment of the present disclosure is illustrated schematically in overview as comprising a first communication link 1100, 3100, 2100 comprising a first AN modem 1100, a first twisted copper pair comprising a pair of twisted copper wires 3100 and a first CPE modem 2100, a second communication link 1200, 3200, 2200 comprising a second AN modem 1200, a second twisted copper pair 3200 and a second CPE modem 2200, a common binder 4000, a distribution point unit 5000, a central controller 6000, a Network Records Database 7000 and a PSD Mask store 7010. The first and second AN modems are collocated within a common Access Node 1010 which, in this embodiment, is itself contained within a street cabinet 1000. On exiting the street cabinet, the first and second pairs 3100, 3200 are housed within a common binder 4000 until the binder reaches a distribution point 5000 where the pairs separate and follow separate routes the first CPE modem 2100 and the second CPE modem 2200, respectively.

The first AN modem 1100 comprises a set of analog components 1110 which operate in a conventional way to perform analogue to digital and digital to analogue conversions and signal amplifications and shaping, etc. Additionally the first AN modem comprises a standard DSL digital processing unit for performing standard DSL digital processing including Inverse FFT and FFT functions, etc., in a manner compliant with the G.fast protocol.

In addition to these components 1110 and 1120, the first AN modem additionally comprises a length estimation module 1130, a PSD mask selection/generation/reception module 1140, a PSD mask controller 1150 and a PSD mask store 1160. The length estimation module is operable to estimate the length of the first pair 3100 according to any suitable method such as, for example, that taught in U.S. Pat. No. 8,588,285.

The PSD mask selection/generation/reception module 1140 is operable to perform any of the following functions:
1. mask selection—based on the estimated line length and a determination of the nature of the DSL protocol (if any) being carried out over the second communication link, the PSD mask selection/generation/reception module is operable to select from the PSD mask store 1160 a suitable downstream PSD mask using the estimated line length and the nature of the DSL protocol carried out on the second (or any further neighboring lines where there is more than one neighboring line) (in particular ascertaining if any of the second or other neighboring lines are employing VDSL2 and, if they are, whether the VDSL2 lines are operating as a vectored group in which there transmissions are being co-ordinated so as to minimize the effects of crosstalk between one another) as inputs to the selection process. In the present embodiment, the AN modem 1100 can obtain the information about the operation of the neighboring modem 1200 by querying the Access Node 1000 which can directly access information about the protocols employed by other modems within the access node;

2. mask generation—based on the estimated line length and a determination of the nature of the DSL protocol (if any) being carried out by the second (or any other) neighboring line(s), generating a downstream PSD mask. This could be done by selecting component parts of the PSD mask and combining them together, or by employing a generating function which generates a suitable mask based on the input values relating to the estimated line length and the nature of the DSL protocols being carried out by the neighboring line(s);

3. mask reception—the PSD mask selection/generation/reception unit simply receives a mask from an external device—most likely the central controller 6000 which has determined a suitable downstream PSD mask for the AN modem 1100 to use (and possibly one also for the CPE modem 2100 which the AN modem 1100 needs to forward to the CPE modem 2100—in particular to the PSD mask selection/generation/reception module 2140 thereof).

The PSD mask controller 1150 communicates with the standard components 1120 and 1110 to ensure that the downstream PSD mask is adhered to in all transmissions sent onto the first pair 3100 by the modem 1100. As noted above, the PSD mask store 1160 simply stores precalculated downstream PSD masks which can be searched through and selected to enable the PSD mask selection/generation/reception module to select a suitable downstream PSD mask when performing a mask selection function. Note that in alternative embodiments, the mask selection/generation/reception module may be able to perform only one or a subset of these functions.

The second AN modem is a VDSL2 modem in the present embodiment.

The first CPE modem 2100 has corresponding components to those described above with relation to the first AN modem 1100 and so they will not be described again here. Their function is similar to the corresponding components of the AN modem 1100 mutatis mutandis.

The second CPE modem is also a VDSL2 modem in the present embodiment.

In the present embodiment, the central controller can generate or select a suitable PSD mask for one or both (or none) of the first modems 1100 and 2100 by obtaining the relevant line length estimation values and information about the operation of neighboring lines from a Network records database 7000. Based on the information obtained from the network records database 7000 the central controller can either generate a PSD mask in a similar manner to that performed by the PSD mask selection/generation/reception module 1140 when it is performing a PSD mask generation function, or it can select a PSD mask in a similar manner to that performed by the module 1140 when it is performing a PSD mask selection function, using the central PSD mask store 7010 instead of the local AN specific PSD mask store 1160 associated with the access node 1000.

Figure 2:
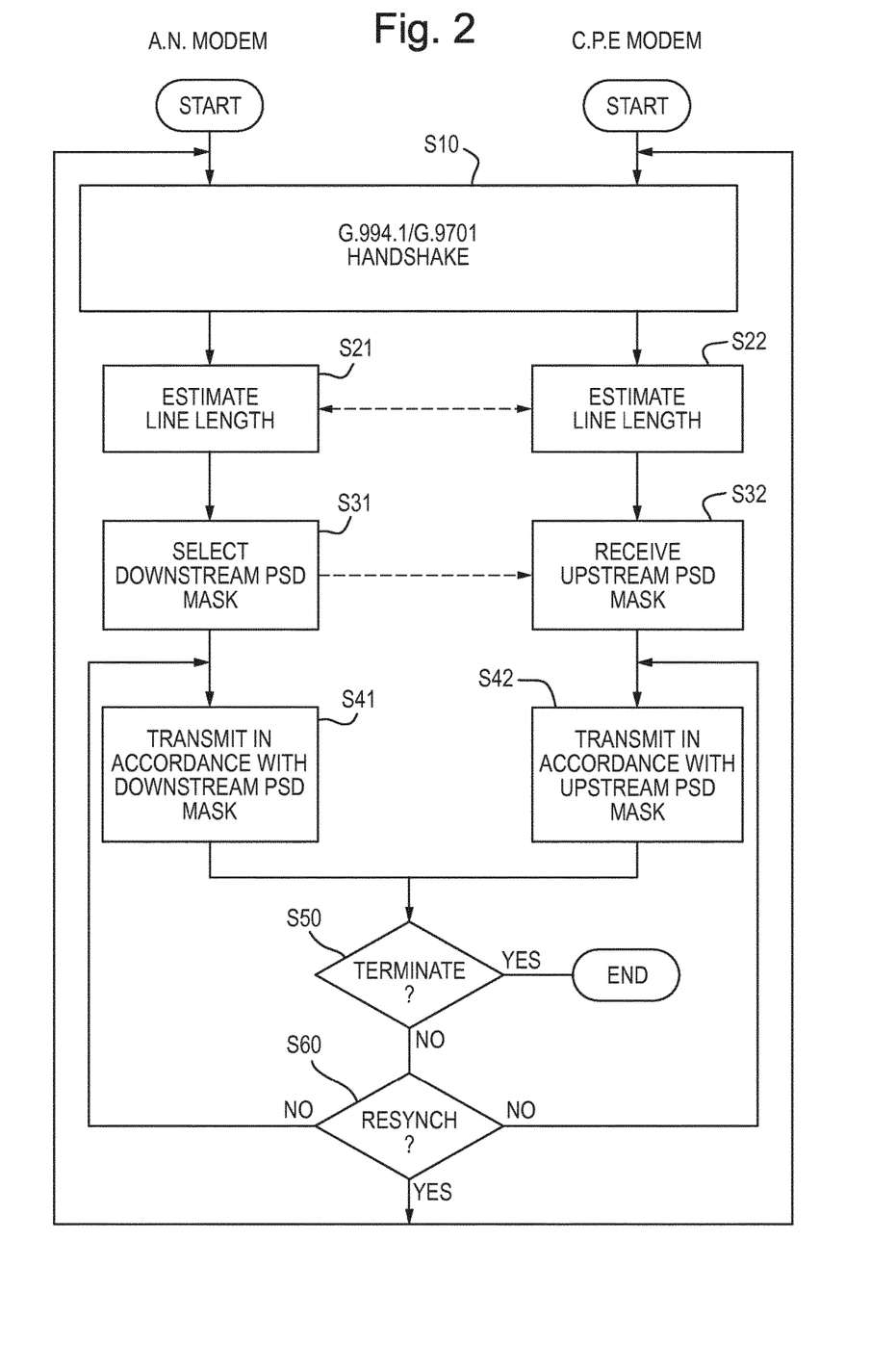
FIG. 2 is a flow chart illustrating the method performed by the modems of the first communication link according to an embodiment of the present disclosure.

Turning now to FIG. 2, the method performed by the first modems 1100 and 2100 in the present embodiment is now described. Upon commencement, the modems at S10 perform a handshake procedure as specified in ITU standard G.994.1 as extended by G.9701. Upon completion of the handshake procedure, the modems proceed to S21 and S22 respectively in which they together (as indicated by the dotted line connecting these two together) estimate the line length of the first copper pair 3100. Different embodiments can estimate the length to different extents and using different methods. Moreover, the "estimation" could in different embodiments comprise simply receiving an estimation from a central controller 6000. In the present embodiment, estimation of line length is performed at the AN modem in S21 using the Hlog information obtained by the AN modem in cooperation with the CPE modem. In the present embodiment, the line length estimation determines a line length with only relatively coarse granularity. In particular, the output of the estimation is one of only 6 possible values of 30 m, 130 m, 230 m, 330 m, 430 m or 530 m and the estimation process seeks to determine which of these possible output values is closest to the actual line length.

Upon completion of S22 the CPE modem proceeds to S32 in which it receives an upstream PSD mask selected for it by the AN modem. (Note that in alternative embodiments it could however obtain the PSD mask for itself or it could receive it from the AN modem acting merely as a forwarding agent, the PSD mask having been obtained in fact by a central controller 6000.)

Upon completion of S21, the AN modem proceeds to S31 in which (in the present embodiment) it performs selecting upstream and downstream PSD masks based on which of the 6 possible estimated line length values was chosen at S21. Additionally in S31, the AN modem obtains from the Access Node 1010 a neighbor parameter which can take any one of three possible values, being "none", "non-vectored" or "vectored" which indicates whether any other lines terminated at the access node 1010 are operating using the VDSL2 protocol or not and if so whether they are operating in a vectored mode of operation (note that "none" indicates that there are no other lines terminated at the access node which are operating using VDSL2—in such a case the modem 1100 can use the full amount of PSD permitted by the G.9700 standard for when there are no other protocols in the vicinity which need to be accommodated—"non-vectored" indicates that there are neighboring VDSL2 lines present at least some of which are not in a common vectored group and "vectored" indicates that there are neighboring lines present which are all operating using vectored VDSL2—crosstalk is particularly harmful in such a case and so tends to produce the most constraining PSD mask (with very little gain over the most conservative approach of not allowing any significant PSD in frequency ranges employed by VDSL2)). In the present embodiment, this information is then used at S31 to select from the PSD mask store 1160a suitable upstream and downstream PSD mask based on the actual combination of estimated length values and the neighbor parameter (18 combinations in total although in the present embodiment if the neighbor parameter has value "none" then the value of the estimated length is irrelevant and the least constraining PSD mask is used as specified in G.9700, resulting in just 13 different sets of Upstream and downstream PSD masks in the present embodiment). The stored PSD masks associated with the particular combination of neighbor parameter and estimated line length are then selected and the selected upstream mask is transmitted to the CPE modem which receives it at S32.

Upon completion of S31 and S32 the modems proceed to S41 and S42, respectively, in which the thus selected PSD masks are used to constrain the transmission of signals by the modems to not exceed the PSD limits specified in the PSD masks in the normal manner in which such PSD masks are used.

S50 and S60 are included for completeness sake only: if it is detected at S50 that the communication link should be terminated then the method ends. If it is not to be terminated the method proceeds to S60 at which it is checked if the communication link should be resynchronized. If so the modems loop back to S10 for resynchronization, otherwise the modems loop back to S41 and S42, respectively, to continue to transmit data in accordance with the respective PSD masks.

Figure 3:
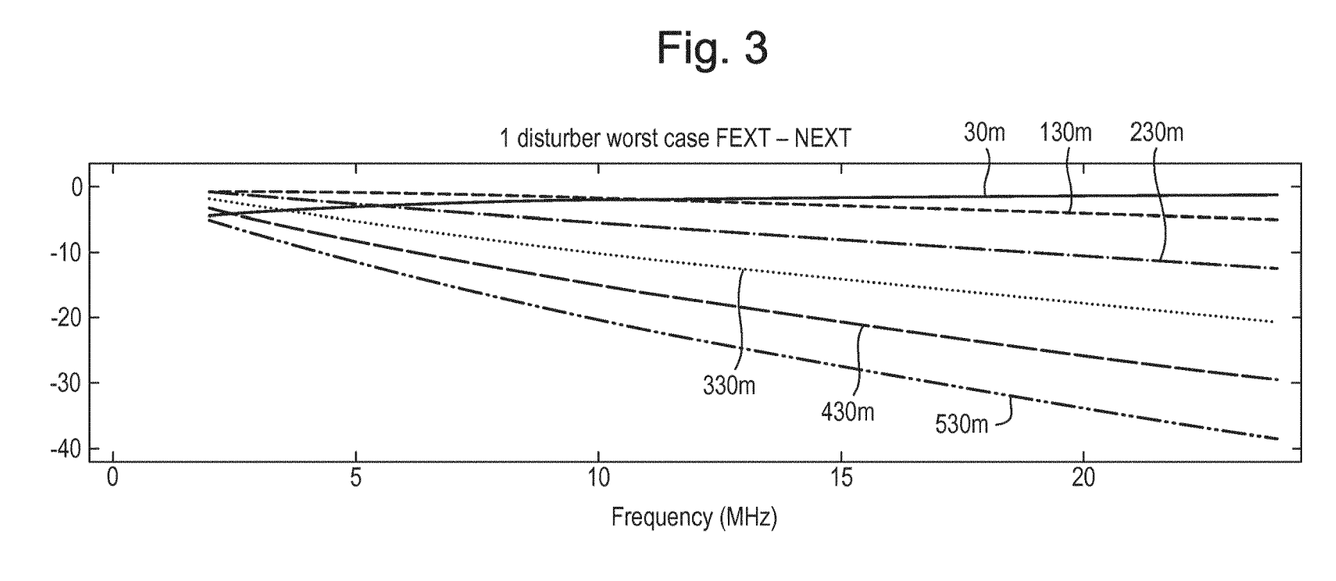
FIG. 3 is a schematic graph illustrating plots FEXT-NEXT in dB's as a function of frequency (in MHz) for line lengths of 30 m, 130 m, 230 m, 330 m, 430 m and 530 m.

Turning now to FIG. 3, this illustrates how, for a given loop length the FEXT NEXT ratio is constant into any other lines. FIG. 3 shows the coupling difference for loop lengths {0.03, 0.13, 0.23, 0.33, 0.43, 0.53} km. These differences have then been used to generate corresponding upstream and downstream masks based on a set of base masks (one base mask for each line length) and three of these are shown in FIGS. 4-6 (for line lengths 30 m, 330 m and 530 m, respectively).

Figure 4:
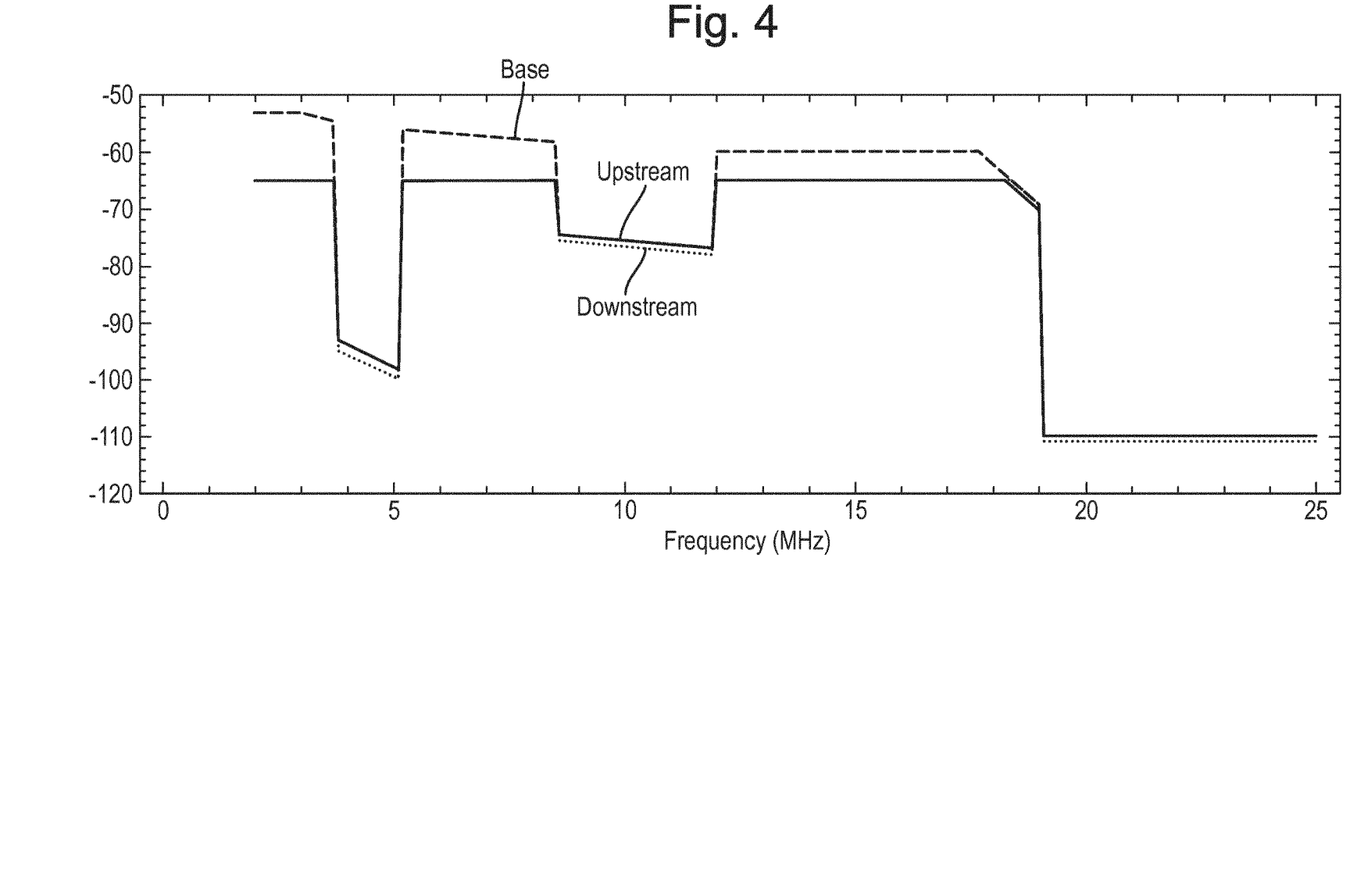
FIGS. 4 to 6 are schematic graphs illustrating base PSD masks and corresponding upstream and downstream TDD PSD masks for a 30 m, 330 m and 530 m length line, respectively.
Figure 5:
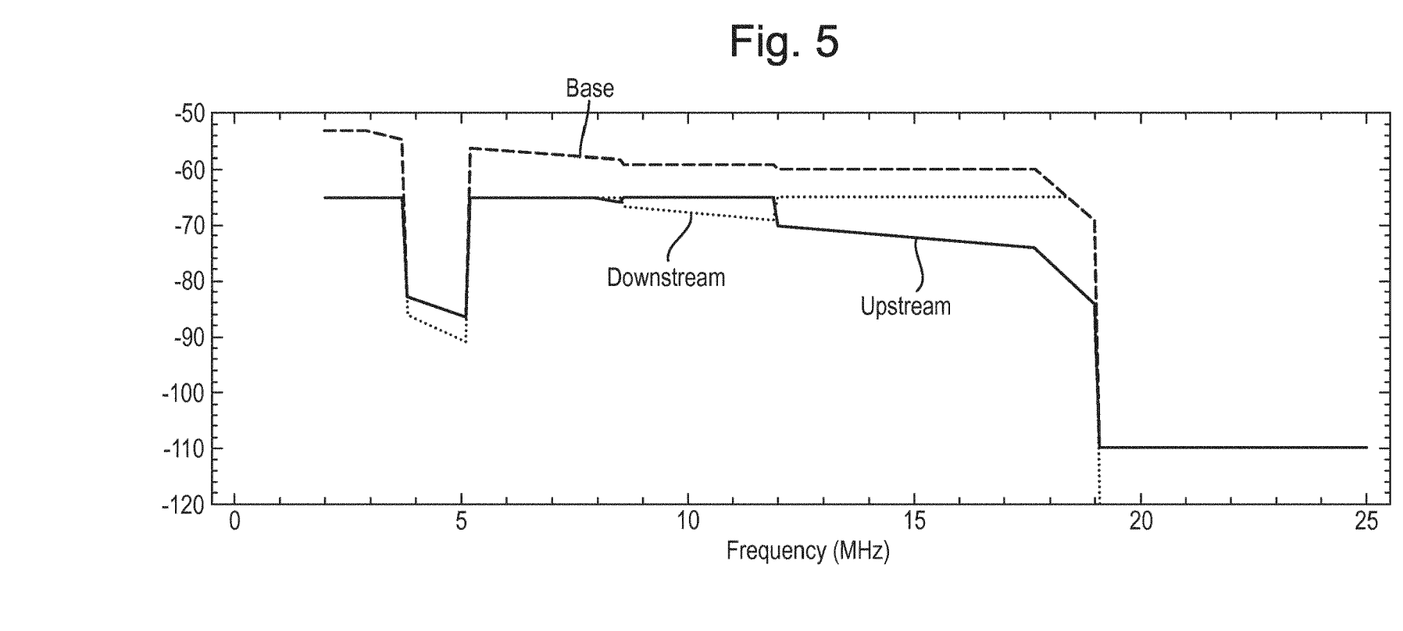

Note that in FIG. 4 except for at the VDSL2 upstream frequency ranges (3.75 MHz-5.2 MHz and 8.5 MHz-12 MHz) the upstream and downstream PSD's are constrained by the absolute limit on PSD set by G.9700 (of about −65 dBm/Hz up to about 18 MHz) rather than concerns over causing excessive crosstalk to neighboring VDSL lines, so the two lines overlap each other in the downstream frequency regions.

Figure 6:
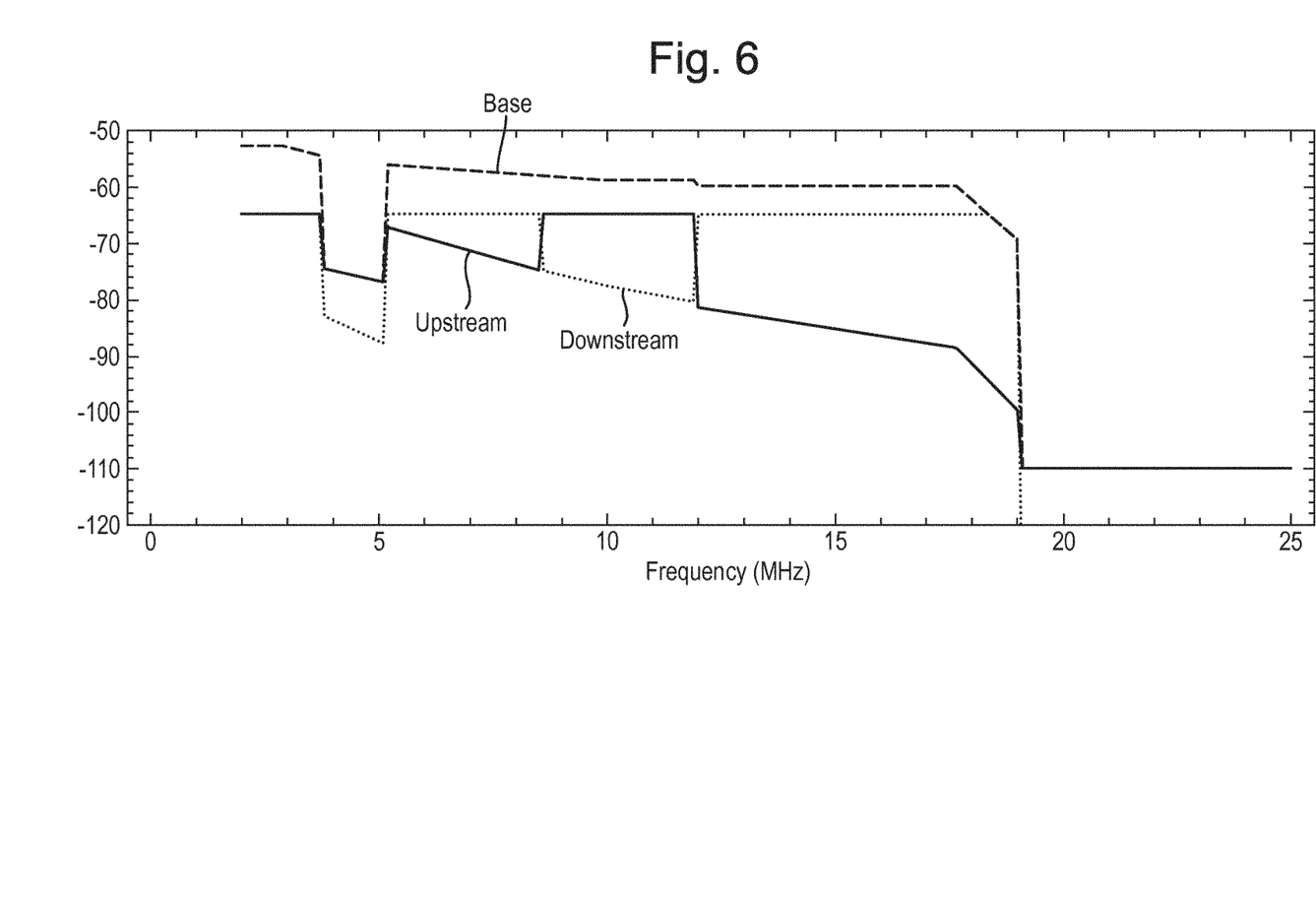

In FIG. 6 it can be seen that the G.fast upstream PSD line follows the 530 m curve of FIG. 3 in (the majority of) the downstream regions (between 5.2 MHz and 8.5 MHz and from 12 Mhz up to about 16 MHz) while the downstream G.fast PSD mask line follows that 530 m curve of FIG. 3 in the upstream regions (between 3.75 MHz and 5.2 MHz and between 8.5 MHz and 12 MHz). Outside these regions, the PSD lines again follow the −65 dBm limit imposed by G.9700.

The generation of these masks is based on the following assumptions:
  The target is to get the most out of the spectrum below 17 MHz from G.fast and VDSL2 with as simple a solution as possible.
  G.fast should cause no harm to existing VDSL2 circuits worse than existing VDSL2 would cause and that this is achieved by matching the received noise.
  Assume NEXT and FEXT have strong correlation and that there is a loop length dependant fixed offset between them.
  Cabinet location case with collocated CPE, X and Z are 0 dB.
  The effect of aliasing through the VDSL2 FFT is excluded.
  As mentioned above, in the case where the all the CPE are collocated if one considers the DS G.fast transmission, it will cause FEXT coupling into the DS VDSL2 receiver (at the CPE) and NEXT coupling into the US VDSL2 receiver (at the DSLAM.) So in the downstream VDSL2 frequency bands G.fast could transmit up to the VDSL2 PSD mask and in the upstream we must reduce the power by the NEXT to FEXT ratio.

When designing G.fast psd masks for overlapped operation with VDSL2 and G.fast NEXT coupled noise is compared against VDSL2 FEXT coupled noise the key to estimating a suitable G.fast PSD is the ratio of the NEXT and FEXT coupling.

Assuming perfect correlation between the NEXT and FEXT coupling levels the coupling ratio is fixed for a given loop loss and frequency. An offset could be added to account for imperfect correlation.

Each line in FIG. 3 characterizes the NEXT and FEXT coupling ratio for a different loop length, 30, 130, 230, 330, 430 or 530 m. In the 530 m case the FEXT is relatively weak compared to the NEXT coupling. These ratios at a given loop length should be the same for each pair to pair coupling and indicate how much below VDSL2 template the G.fast template psd would have to be to ensure the result in noise is no worse.

If one considers the case where the victim VDSL2 isn't collocated with the G.fast system
  where the G.fast line is shorter than the VDSL2 circuit the same rules apply and work.
  where the G.fast line is longer than the VDSL2 circuit the it is a little more complicated.
  The G.fast US signal is probably weaker than required to meet the assumptions.
  The G.fast DS signal is likely to be strong than should be to meet the assumptions.

If the correlation between NEXT and FEXT level is not perfect then a further reduction in PSD levels may be required to increase the probability that the PSD level is still safe.

More thoroughly, one may consider the upstream and downstream VDSL2 frequency bands and vectored and non-vectored cases separately thus:
  In the VDSL2 downstream frequency bands where the VDSL2 is not vectored G.fast could transmit up to the VDSL2 DS PSD template.
  In the VDSL2 downstream frequency bands where the VDSL2 is vectored the G.fast could transmit up to the VDSL2 DS PSD reduced by the vectoring gain.
  In the VDSL2 upstream frequency bands where the VDSL2 is not vectored the G.fast could transmit up to the VDSL2 US PSD mask, reduced by the NEXT to FEXT coupling ratio.
  In the VDSL2 upstream frequency bands where the VDSL2 is vectored the G.fast could transmit up to the VDSL2 US PSD mask, reduced by the vectoring gain and the NEXT to FEXT coupling ratio.

A similar set of statements can be produced for the upstream G.fast PSDs from the CPE.

Note, the PSD levels illustrated in FIGS. 4-6 are slightly lower than possible due to an assumed zero length final drop to a customer's premises. A realistic minimum amount of drop wire to account for the lead into the house and any cabling through the house to the NTE is about 30 m. A 30 m final drop would reduce the NEXT coupling to FEXT coupling ratio and hence the transmit G.fast PSDs could be increased. For example at 17 MHz changing the ratio of Y to Z in the cabinet use case would reduce the NEXT coupling by 2.5 dB.

If VDSL2 is vectored then the PSDs of G.fast would be reduced by a further 25 dB (before applying the −65 dBm/Hz PSD limit) to avoid harming the VDSL2. For example, in the 330 m case in the DS3 band (from 12 MHz to about 16 or 17 MHz) the G.fast upstream PSD limit would be between −95 dBm/Hz and −100 dBm/Hz. See FIG. 6. In the presence of VDSL2 crosstalk these PSDs limits are unlikely to give much useful capacity for G.fast.

Note that FIGS. 4-6 indicate the PSD's for both upstream and downstream falling to very low values as they approach the end of the frequency band for use by VDSL2. This is because the base mask used is based on the VDSL2 PSD mask. In fact of course beyond the limit of VDSL2, the PSD for both upstream and downstream G.fast PSD masks can increase back up to that permitted in G.9700.

G.fast has been designed with coexistence with legacy services in mind and it should be possible to deploy G.fast without significant adverse effects on legacy services.

The present specification shows how static PSDs could be designed to protect VDSL2 from G.fast when deployed with overlapping spectrum and collocated DSLAMs and collocated CPEs.

Semi static PSDs have the potential to allow overlapped operation with VDSL2 without adverse effects on VDSL2 or the complexity of DSM systems.

The invention claimed is:

1. A method of operating a power spectral density (PSD) controlled modem within a first communication link comprising a first pair of metallic wires and communicating modems connected at each end thereof, the first pair of metallic wires having an access network end and a remote end and the communicating modems comprising a first access network side modem connected to the access network end of the first pair of metallic wires and a first remote side modem connected to the remote end of the first pair of metallic wires, wherein the controlled modem is one of the communicating modems and is a discrete multitone modulation modem operating using time division duplexing and is operable to employ a first set of tones whose frequencies fall within a first operational frequency range, wherein the first communication link is operated within the vicinity of at least a second communication link comprising a second pair of metallic wires and communicating modems connected at each end thereof, the modems of the second communication link being discrete multitone modulation modems operating using frequency division duplexing and being operable to employ a second set of tones whose frequencies fall within a second operational range, wherein the first and second communication links are physically located sufficiently closely together for at least a part of their extent, and are operable to employ operational frequency ranges overlapping to a sufficient extent, and at a sufficiently high PSD, that the controlled modem generates a transmission signal which causes undesirable near end crosstalk interference to the second communication link, the method comprising:
    estimating a line length of the first pair of metallic wires;
    generating or selecting a PSD mask, wherein the generated or selected PSD mask depends upon the estimated line length of the first pair of metallic wires; and
    controlling power of transmissions from the controlled modem, by frequency, in accordance with the generated or selected PSD mask.

2. The method according to claim 1, wherein the generated or selected mask additionally depends upon whether the second communication link is operating as part of a vectored group of cooperating communication links, wherein if the second communication link is operating as part of a vectored group of cooperating communication links, the selected or generated mask places a greater constraint on a maximum permitted PSD value for the controlled modem at at least certain frequency ranges.

3. The method according to claim 1, wherein if the controlled modem is the first remote side modem, the generated or selected PSD mask is an upstream PSD mask and if the controlled modem is the first access network side modem, the generated or selected PSD mask is a downstream PSD mask and the generated or selected PSD masks in respect of at least some estimated line length values contain one or more PSD reductions, relative to a base PSD mask.

4. The method according to claim 3, wherein the reductions of the PSD mask for use in controlling the controlled modem depend upon the extent to which near end crosstalk (NEXT) is estimated to exceed far end crosstalk (FEXT) for a communication link whose connecting metallic pair has a line length similar to the estimated line length of the first metallic pair, as a function of frequency.

5. A power spectral density (PSD) controlled modem for use within a first communication link, the first communication link comprising a first pair of metallic wires and communicating first modems connected at each end thereof, the first pair of metallic wires having an access network end and a remote end and the communicating modems comprising a first access network side modem connected to the access network end of the first pair of metallic wires and a first remote side modem connected to the remote end of the first pair of metallic wires, wherein the controlled modem is one of the communicating first modems and is a discrete multitone modulation modem operating using time division duplexing and is operable to employ a first set of tones whose frequencies fall within a first operational frequency range, wherein the first communication link is operated within the vicinity of at least a second communication link comprising a second pair of metallic wires and communicating second modems connected at each end thereof, the second modems of the second communication link being discrete multitone modulation modems operating using frequency division duplexing and being operable to employ a second set of tones whose frequencies fall within a second operational range, wherein the first and second communication links are physically located sufficiently closely together for at least a part of their extent, and are operable to employ operational frequency ranges overlapping to a sufficient extent, and at a sufficiently high PSD, that the controlled modem generates a transmission signal which causes undesirable near end crosstalk interference to the second communication link, the controlled modem comprising:
    an instrument for obtaining measurements of the first pair of metallic wires and estimating therefrom a line length of the first pair of metallic wires;
    a PSD mask generator or selector for generating or selecting a PSD mask, wherein the generated or selected PSD mask depends upon the estimated line length of the first pair of metallic wires; and
    a signal shaper for controlling power of transmissions from the controlled modem, by frequency, in accordance with the generated or selected PSD mask.

6. A central controller device for generating and communicating a power spectral density (PSD) mask to a (PSD) controlled modem for use within a first communication link, the first communication link comprising a first pair of metallic wires and communicating first modems connected at each end thereof, the first pair of metallic wires having an access network end and a remote end and the communicating modems comprising a first access network side modem connected to the access network end of the first pair of metallic wires and a first remote side modem connected to the remote end of the first pair of metallic wires, wherein the controlled modem is one of the communicating first modems and is a discrete multitone modulation modem operating using time division duplexing and is operable to employ a first set of tones whose frequencies fall within a first operational frequency range, wherein the first communication link is operated within the vicinity of at least a second communication link comprising a second pair of metallic wires and communicating second modems connected at each end thereof, the second modems of the second communication link being discrete multitone modulation modems operating using frequency division duplexing and being operable to employ a second set of tones whose frequencies fall within a second operational range, wherein the first and second communication links are physically located sufficiently closely together for at least a part of their extent, and are operable to employ operational frequency ranges overlapping to a sufficient extent, and at a sufficiently high PSD, that the controlled modem generates a transmission signal which causes undesirable near end crosstalk interference to the second communication link, the central controller device comprising:

an interface to a records database for obtaining an estimate of a length of the first pair of metallic wires;

a PSD mask generator or selector for generating or selecting a PSD mask, wherein the generated or selected PSD mask depends upon the estimated length of the first pair of metallic wires; and     a transmitter for transmitting the generated or selected PSD mask to the controlled modem, for use by a signal shaper within the controlled modem for controlling power of transmissions from the controlled modem, by frequency, in accordance with the transmitted generated or selected PSD mask.

7. A non-transient computer readable storage medium storing processor implementable instructions which, when executed by a processor, cause the processor to carry out the method of claim 1.

* * * * *